(No Model.)  
6 Sheets—Sheet 2.

I. D. STEVENS.
SEEDING MACHINE.

No. 595,587. Patented Dec. 14, 1897.

Witnesses:  
Chas. C. Thwey  
R. P. Bailey

Inventor:  
Irving D. Stevens.  
by Wilcox Mercur Pitner  
His Atty.

(No Model.) 6 Sheets—Sheet 3.
I. D. STEVENS.
SEEDING MACHINE.
No. 595,587. Patented Dec. 14, 1897.
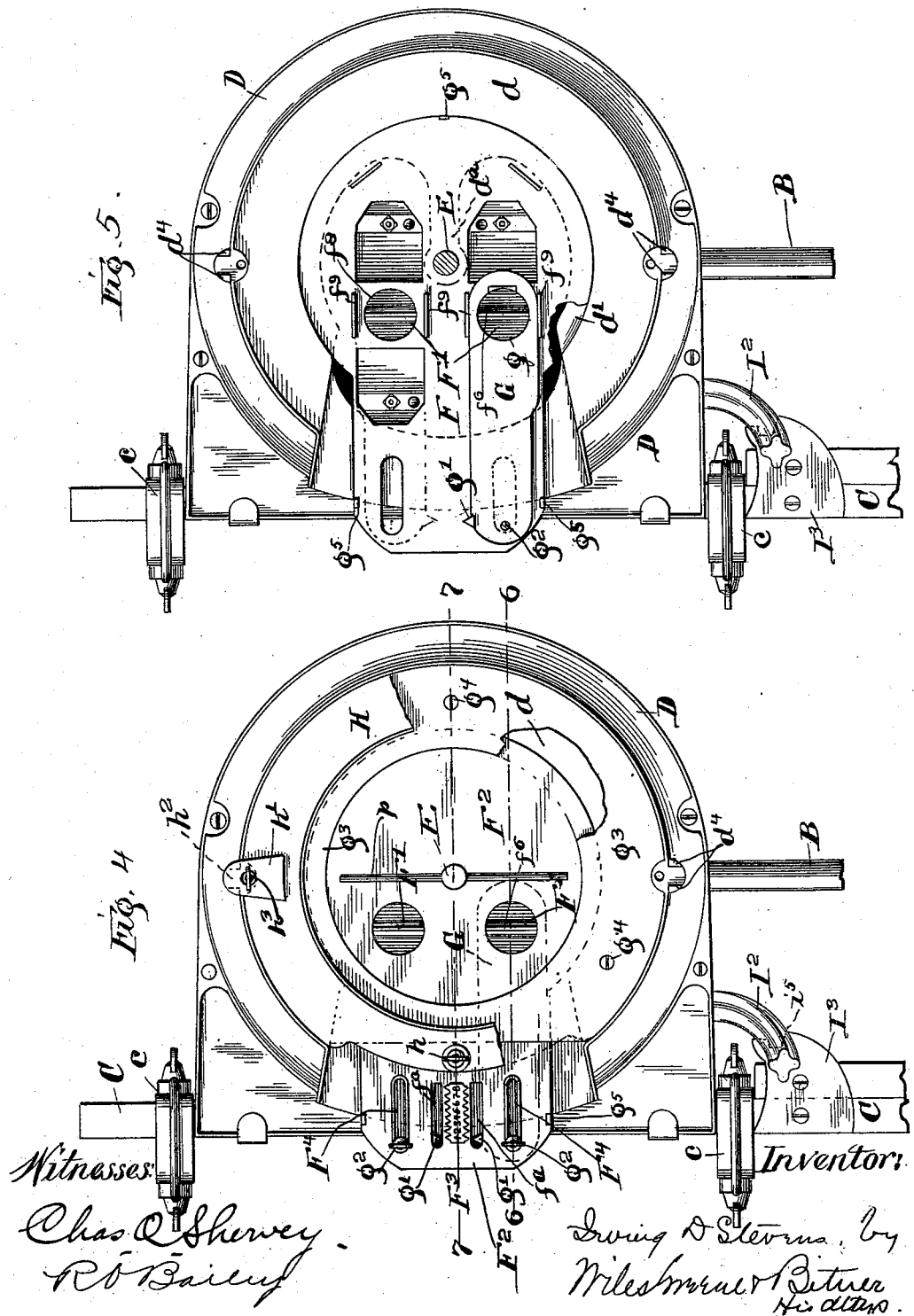

(No Model.) 6 Sheets—Sheet 4.
I. D. STEVENS.
SEEDING MACHINE.
No. 595,587. Patented Dec. 14, 1897.
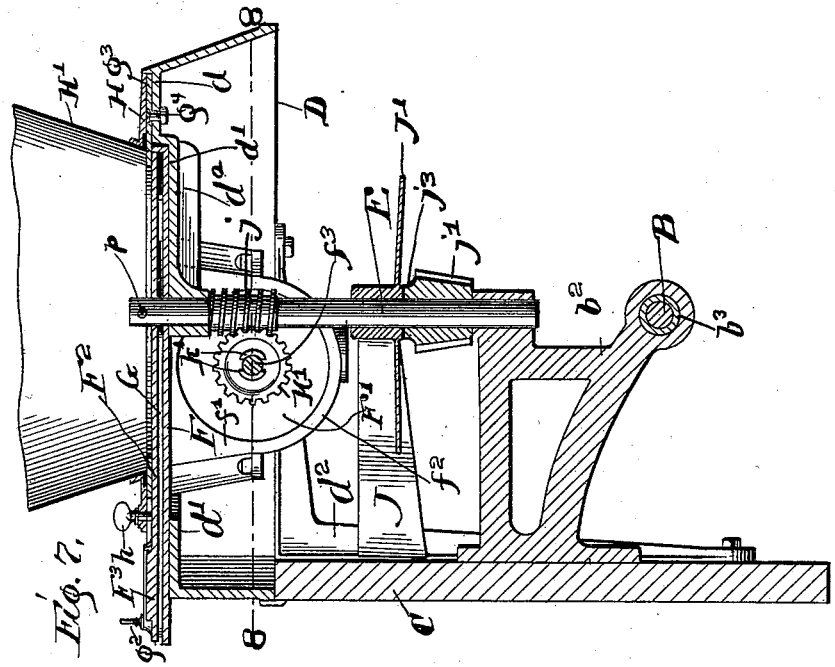
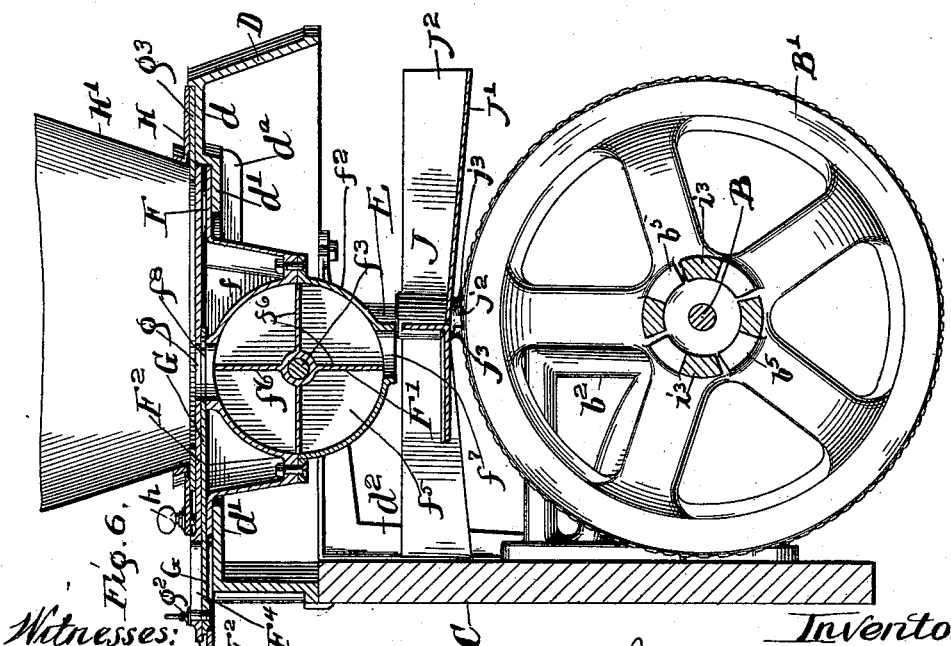
Witnesses:
Chas. O. Hervey.
R. O. Bailey
Inventor:
Irving D. Stevens
by Miles, Myrne & Bitner,
His Attys (No Model.) 6 Sheets—Sheet 5.
I. D. STEVENS.
SEEDING MACHINE.
No. 595,587. Patented Dec. 14, 1897.
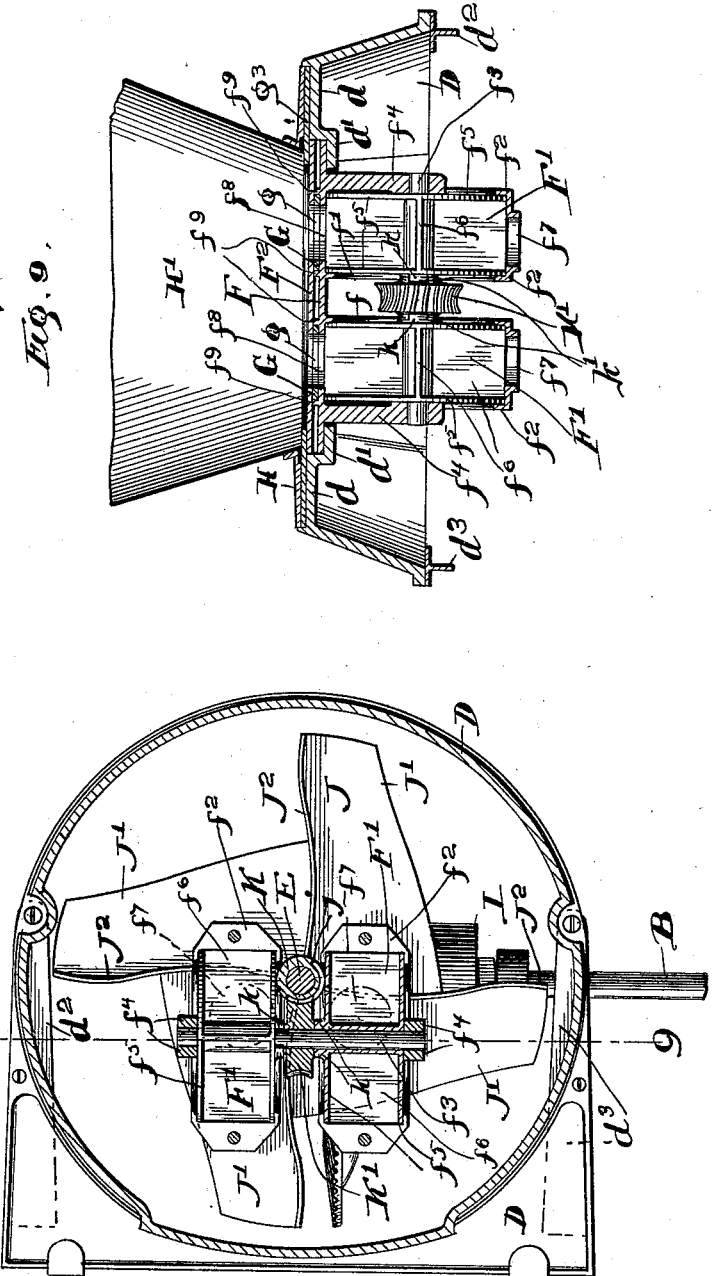
Witnesses:
Chas. A. Hervey
R. O. Bailey
Inventor:
Irving D. Stevens
by Miles, Morse & Bitner
His Attys.

(No Model.) 6 Sheets—Sheet 6.
I. D. STEVENS.
SEEDING MACHINE.
No. 595,587. Patented Dec. 14, 1897.
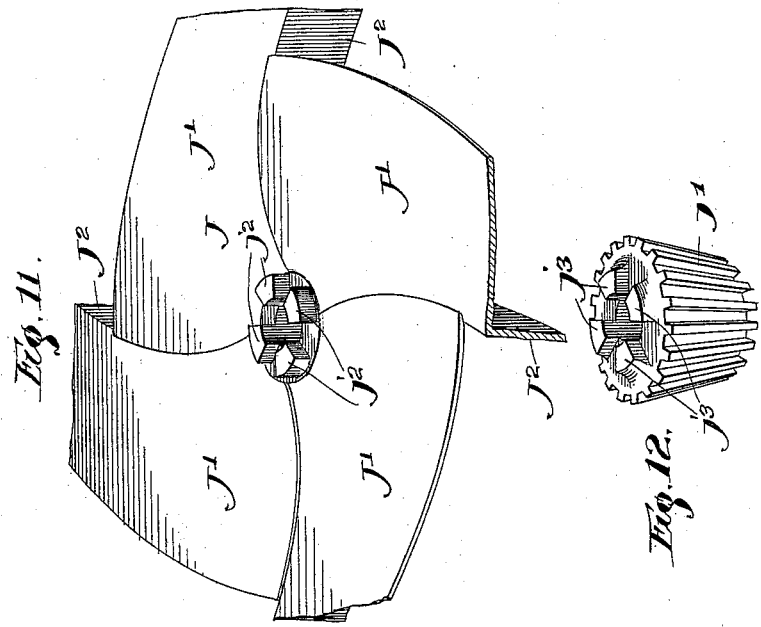
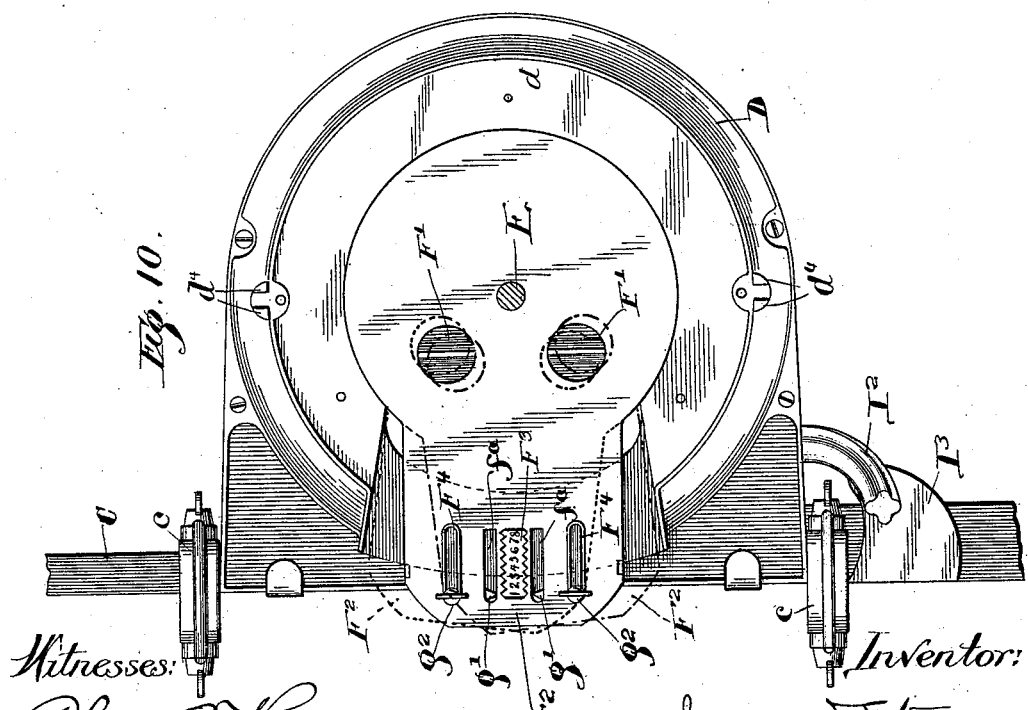
Witnesses: Inventor:

UNITED STATES PATENT OFFICE.

IRVING D. STEVENS, OF JOLIET, ILLINOIS.

SEEDING-MACHINE.

SPECIFICATION forming part of Letters Patent No. 595,587, dated December 14, 1897.

Application filed March 24, 1897. Serial No. 629,032. (No model.)

*To all whom it may concern:*

Be it known that I, IRVING D. STEVENS, a citizen of the United States of America, residing at Joliet, in the county of Will and State of Illinois, have invented certain new and useful Improvements in Seeding-Machines, of which the following is a specification.

My invention relates to certain new and useful improvements in seeding-machines, the object being to produce a simple, practical, and comparatively inexpensive machine which will cast seed or other like material with great regularity and evenness.

It relates also to suitable means for adjustably securing the machine in place upon the end-gate of a wagon to bring it in proper relation to the power which drives it, for removably securing the hopper to the casing or shell of the machine, for throwing the machine into or out of engagement with the driving mechanism, for sowing the seed evenly on both sides of the wagon when wind is blowing from one side or the other, for varying the amount of seed sown, for cutting off the flow of the same, for bringing the seed in such a position upon the distributing-fan that it will cast the seed in a semicircle back of the wagon, and to certain other minor features and details of construction the nature and purpose of which will be fully described in the following specification and more definitely pointed out in the claims appended hereto.

The invention is fully described in this specification and clearly illustrated in the accompanying drawings, in which—

Figure 1:
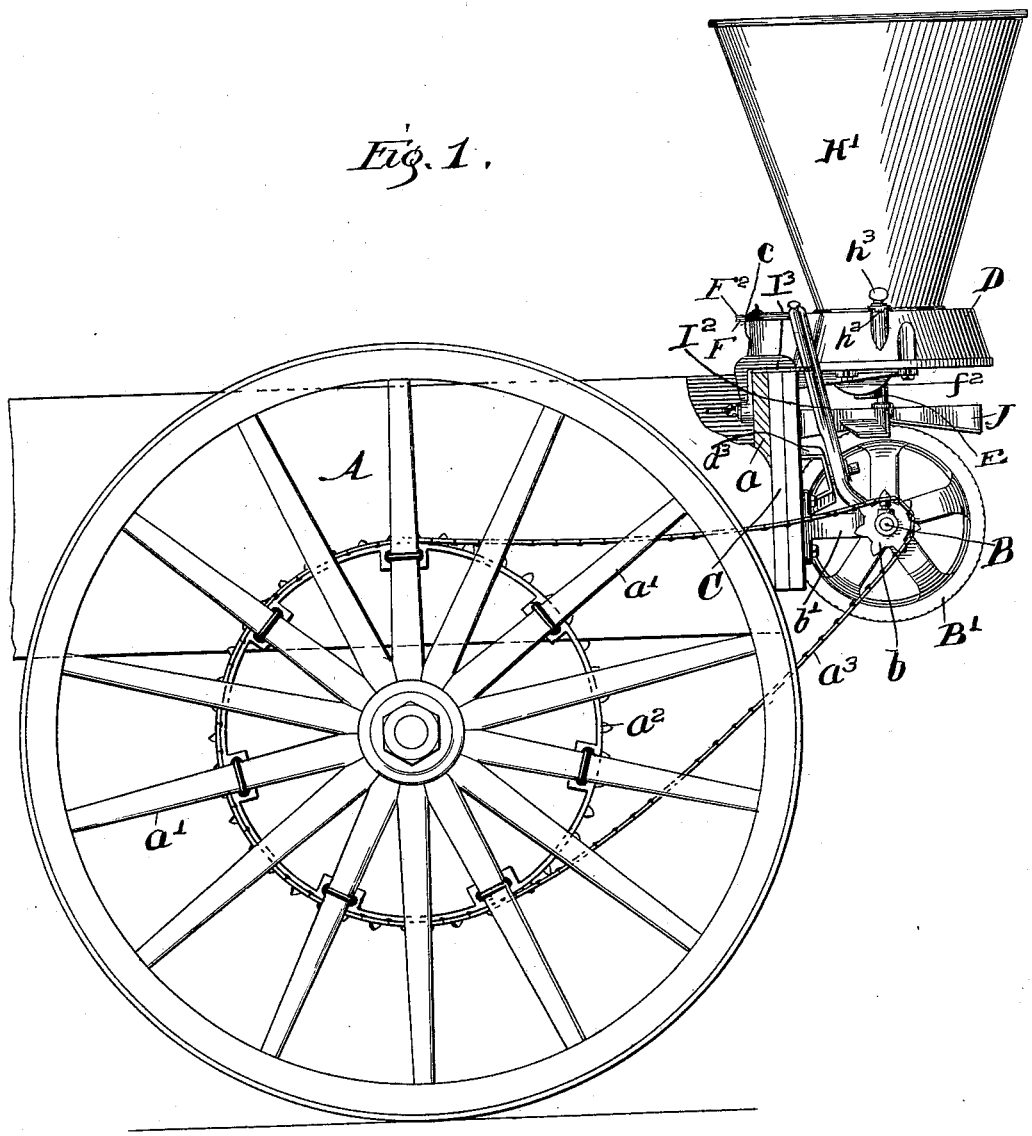
Figures 2, 3:
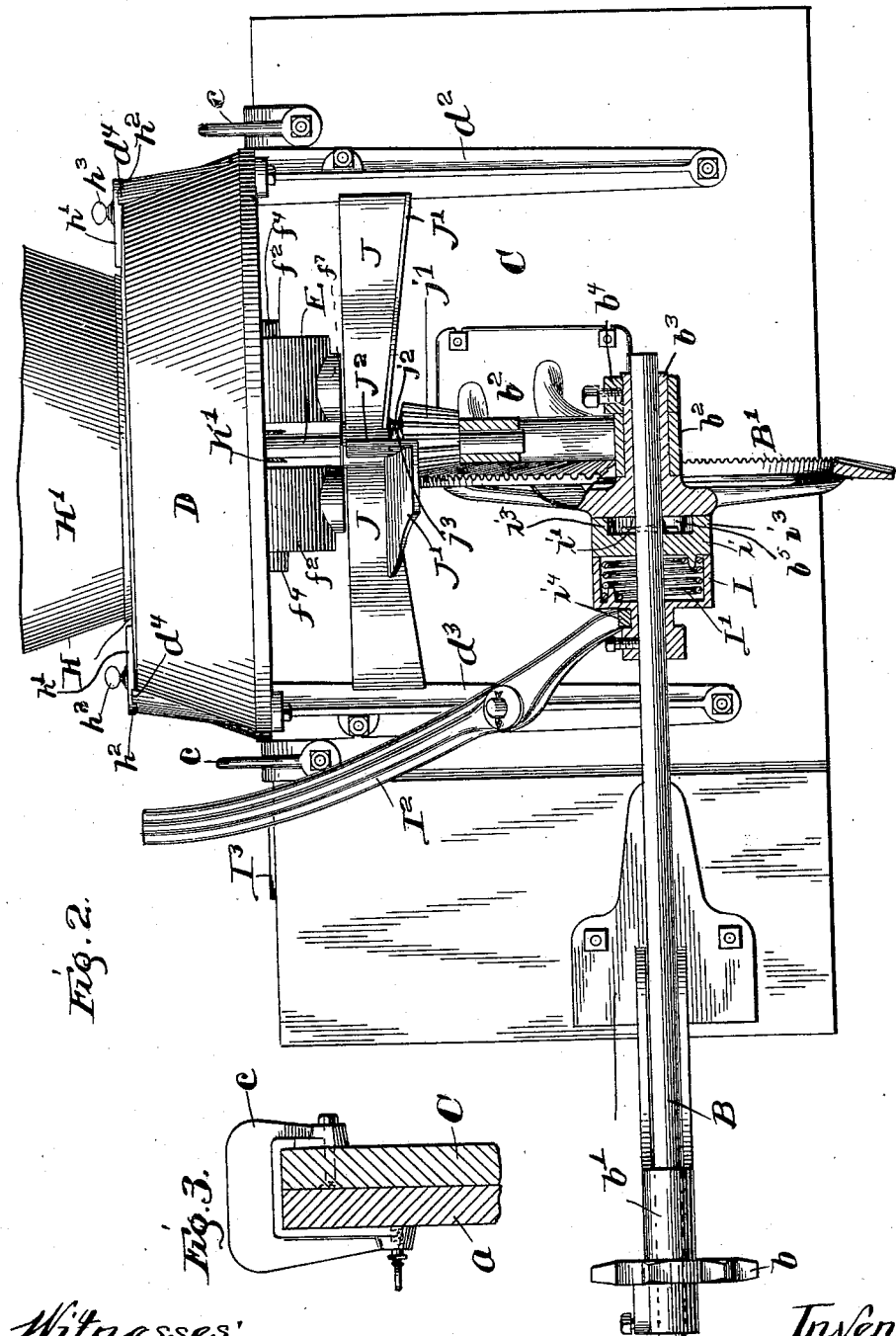

Figure 1 is a side elevation of a portion of a wagon, showing my improved seeding-machine attached thereto. Fig. 2 is a front elevation of the machine, certain portions being broken out in order to show certain important features which would otherwise be hidden from view. Fig. 3 is a detail side elevation of a clamp used in securing the machine to the end-gate of a wagon, said end-gate and the frame used to support the machine being in vertical cross-section. Fig. 4 is a top plan of a portion of the machine, the hopper being removed and certain parts broken out to illustrate other portions. Fig. 5 is a similar view with the hopper-retaining ring, a clamping-ring, and a portion of the wind-gage removed. Fig. 6 is a vertical cross-section in line 6 6 of Fig. 4. Fig. 7 is a similar section in line 7 7 of Fig. 4. Fig. 8 is a horizontal section in line 8 8 of Fig. 7. Fig. 9 is a vertical cross-section in line 9 9 of Fig. 8. Fig. 10 is a plan view with all of the parts above the wind-gage removed, said wind-gage being shown in full lines in its normal position and in dotted lines in positions on either side of the normal one. Fig. 11 is a perspective view of the distributing-fan, partly broken away and showing the same in an inverted position; and Fig. 12 is a perspective view of a pinion adapted for engagement with said distributing-fan.

In Fig. 1 a portion of the box of a wagon is seen at A, the end-gate at $a$, and one of the rear wheels at $a'$. Upon the spokes of said wheel is secured a sprocket-wheel $a^2$, which is connected with a smaller sprocket-wheel $b$, fast upon a shaft B, by means of a chain $a^3$. The machine is mounted upon a frame C, which is provided with a pair of clamps $c$, adapted to be hooked over the end-gate and provided with set-screws by which the frame C may be clamped to the end-gate. By the use of these clamps the frame may be secured to the end-gate at any point along the same, whereby the machine may be accommodated to different widths of wagons.

The main body or casing of the machine is seen at D and has preferably the shape of a truncated hollow cone, the top being recessed to receive the wind-gage, a clamping-ring $g^3$, and a hopper-retaining ring H, ledges $d\ d'$ being left in the top to support said parts. A pair of brackets $d^2\ d^3$ are secured to the frame C to support the casing. An opening is formed in the top of the casing, and an arm $d^a$, preferably integral with the casing, extends forward in said opening to assist in supporting a vertical shaft E.

Upon the ledge $d'$ is placed the wind-gage, which consists of a plate F, having an opening through which the shaft E may pass and preferably shaped as shown in Fig. 5, a portion of this plate being almost a complete circle, the ends of which are connected by an approximately rectangular portion extending toward the wagon and beyond the casing D. A pair of hollow brackets $f\ f'$ extend downward from the plate F and contain feed-wheels F', loose upon a shaft $f^3$, secured in depending arms $f^4$. (See Figs. 8 and 9.) The feed-wheels F' are interlocked with a worm-wheel K', hereinafter described, thus making a long journal-bearing upon the shaft $f^3$. As shown, these feed-wheels are formed with circular sides $f^5$, connected by wings $f^6$, which separate them into separate pockets, into which the seed drops and is afterward carried to the distributing-fan J. These brackets extend down to a plane passing horizontally through the shaft $f^3$. Caps $f^2$ are secured to the brackets to complete the chamber around the feed-wheels, openings $f^7$ being formed in the bottom of the caps, through which the seed drops. These openings are located as near to the shaft E as possible, so that the centrifugal force developed by the fan may affect it evenly and distribute it regularly.

In the plate F are formed openings $f^8$, through which the seed falls into the feed-wheels, and I have provided slide-valves G for limiting the amount of seed which may pass into the feed-wheels, these valves being formed with openings corresponding with the openings $f^8$. The slide-valves are located immediately above the plate F, and above both is placed a retaining-plate $F^2$, shaped similar to the plate F and separated therefrom by lugs formed upon the latter. Four of these lugs are seen at $f^9$ and guide the slide-valves when they are adjusted forward or backward. Upon the end of the plate $F^2$ is a dial $F^3$, and upon the valves G G are formed pointers $g'$, extending up through openings $f^a$ in the plate $F^2$ and pointing to the dial $F^3$. Set-screws $g^2$ are threaded in the valves and extend through slots $F^4$ in the plate $F^2$. By means of these the slide-valves may be moved forward or backward in increasing or decreasing the size of the openings in the feed-wheel chambers, thereby adapting the machine to sow different kinds and sizes of seed. These slide-valves may evidently be adjusted independently of each other, thereby allowing a greater amount of seed to fall upon one side of the fan than upon the other, which is often necessary in order to cast the seed properly. The plates F $F^2$ are held together by an annular ring $g^3$, which rests upon the ledge $d$ and extends over the plate $F^2$ sufficiently to retain the same in place. It is secured to the top of the casing by screws $g^4$. The plates F $F^2$ are also connected together by means of lugs $g^5$, resting in corresponding notches in the plate $F^2$, which prevents any movement of one without the other. The plates F $F^2$ are free to swing about the shaft E, and when desired they may be swung toward either side of the machine, the purpose being to drop the seed upon the distributing-fan in such a manner that the same will be thrown away from the fan sooner upon the side from which the wind is blowing in order that the seed may be cast evenly upon both sides of the central line of the machine. The wind-gage is held in place by a thumb-screw $h$, passing through a hopper-retaining ring H, so that when the wind-gage has been adjusted to the proper place the thumb-screw may clamp it in place. The ring H carries the hopper H' and is secured to the shell D by means of two clamps $h'$, as seen in Figs. 2 and 4. Lugs $d^4$ are formed upon the shell, and the clamps are formed with lugs $h^2$, adapted to rest between the lugs $d^4$ and retain the clamps in their proper position. Thumb-screws $h^3$ are passed through the clamps and threaded in the casing D and secure the clamps to the same. These clamps rest upon the hopper-retaining ring H and when the screws are tightened clamp the ring H firmly to the shell.

The main driving-shaft of the machine extends along the frame C and is journaled in brackets $b'$ $b^2$, secured to the frame C, as best seen in Fig. 2. Upon the shaft is loosely mounted a bevel gear-wheel B', a sleeve $b^3$ being formed upon the same, which encircles the shaft and passes through a bearing $b^2$, a collar $b^4$ being provided to hold the gear-wheel in mesh with the pinion $j'$. A clutch mechanism connects the gear-wheel with the shaft, this clutch mechanism comprising, substantially, a shell I, fast upon the shaft, and a disk $i$, loose upon the shaft, but held against the shell I by a pin $i'$, passing through the shaft, as seen in Fig. 2. The shell and disk are connected by a coiled spring I', the ends of which are secured to lugs upon the shell and disk, respectively, the object being to remove any sudden jar upon the working parts when the clutch is thrown into engagement with the gear-wheel. The gear-wheel and disk are each provided with opposing teeth $b^5$ $i^3$, adapted to engage each other, and a lever $I^2$ is pivoted upon the bracket $d^3$ and is forked at $i^4$ to engage the shell I. Upon the frame C is secured a lock-plate $I^3$, having a notch $i^5$, adapted to engage the lever $I^2$ and hold it in place—that is to say, to hold the clutch in engagement with the gear-wheel B'.

Above the plate $F^2$ the shaft E carries a stirring-pin $p$ and below the casing the distributing-fan J, a worm-gear $j$, and the beveled pinion $j'$, the latter being in mesh with the bevel-gear B', and said shaft is journaled in the arm $d^a$ and in the bracket $b^2$, this bracket being arranged to support both the shafts E and B. By the use of this large gear-wheel and small pinion great speed is given to the fan, which is necessary in order to cast the seed in the most desirable manner and to cover the greatest area possible. The fan is preferably loose upon the shaft, but is provided with downwardly-extending teeth $j^2$, opposing teeth $j^3$ being formed upon the beveled pinion $j'$ to engage the teeth $j^2$. (See Figs. 11 and 12.)

The fan is preferably formed with four radially-extending wings J', vertical flanges $J^2$ being formed upon one edge of each of the wings and of the reverse-curve shape shown in Fig. 8. This allows the seed to be caught by the flanges and cast away from the same approximately in a semicircle. Above the fan a worm-gear is secured to the shaft E, said worm being in mesh with a worm-wheel K' upon the shaft $f^3$, which carries the feed-wheels. The feed-wheels are each provided with teeth $k$, and the worm-wheel K' is provided on either side with teeth $k'$, adapted to engage the teeth upon the feed-wheels, thereby causing their rotation as the shaft B is rotated, it being evident that the rotation of the worm-gear $j$ must rotate the worm-wheel K'.

The operation of the device is as follows: In the first place the slide-valves G are adjusted in accordance with the kind and quantity of seed to be sown. The wagon is moved at a moderate speed, which rotates the main driving-shaft B through the sprocket-and-chain gearing, and when the clutch mechanism is thrown into engagement with the gear-wheel the working parts of the machine are in operation. The seed is received on the plate $F^2$ in the hopper and flows through the openings in the plate $F^2$, valves, and plate F and into the feed-wheel chamber, where it is received in the pockets in the feed-wheels. It is now carried down to the openings in the caps and falls upon the distributing-fan, which is revolving at a great speed and throws the seed in the form of a semicircle back of the wagon. As has heretofore been stated, the openings in the caps are located in such a position with respect to the distributing-fan that the same will throw the seed in this manner. If the wind is blowing across the field from the right hand, the wind-gage should be swung toward the left, which allows the seed to fall upon the fan so that it will be cast therefrom at a different angle than when it is centrally located. If the wind is blowing from the left, the wind-gage is shifted vice versa. In finishing up a field one of the valves may be pushed in to its limit to cut off the supply on that side, thereby causing the seed to be sown on one side only, and then it is cast from the fan in the form of a quadrant. In driving home both the valves may be pushed in to their limit, which will act as a cut-off and prevent any seed from escaping.

From the above it will be noticed that the device is very simple and economical and is adapted equally as well for sowing large as well as small seed, dry fertilizer, or in fact any other substance that it may be desired to scatter broadcast upon the ground.

By the use of the feed-wheels a certain regular amount of seed is brought down upon the fan continually, thus causing an even distribution of the same. By the use of the worm-gearing between the shafts E $f^3$ the speed of the feed-wheels is greatly reduced from that of the fan, which is evidently necessary to the machine. The operating-lever $I^2$ has been shown in close proximity to the gear-wheel B'. This is evidently an advantage for the reason that the connecting means between the shaft and working part are at the point where the strain comes the most.

It should be noticed that in throwing the clutch into or out of engagement with the gear-wheel B' the driving-shaft is moved longitudinally in the bearing without disarranging the other parts of the machine. This evidently does away with any sliding connection between the clutch and shaft, thereby cheapening and simplifying the same to a great extent.

I am aware that various alterations and modifications are possible, and I do not therefore desire to limit myself except as particularly set forth in the following claims.

I claim as new and desire to secure by Letters Patent—

1. In a seeder, the combination with a frame, C, adapted to support the seeder, of clamps, $c$, secured to the top of said frame and set-screws threaded in said clamps, said clamps being adapted to be hooked over the top of an end-gate of a wagon and the set-screws to impinge upon the same and clamp the frame thereto whereby the seeder may be supported and fastened to the end-gate by said clamps, but may be adjusted along the same at will; substantially as described.

2. In a seeding-machine the combination with a casing, hopper and hopper-retaining ring, of clamps for securing the hopper-retaining ring to the casing comprising substantially the clamps, $h'$, engaging the ring and formed with engaging lugs, $h^2$, coacting lugs, $d^4$, formed upon the casing and adapted to embrace the lugs, $h^2$, upon the clamps and hold the latter in a fixed position with reference to the ring and the set-screws, $h^3$, passing through the clamps and threaded in the casing and adapted to crowd the clamps down upon the hopper-retaining ring; substantially as described.

3. In a seeding-machine a main driving-shaft, B, provided with suitable means for rotation, a gear-wheel having a sleeve encircling said shaft and journaled in a suitable support, said gear being geared to the operating mechanism of the seeder and formed on its rear face with teeth, $b^5$, and a clutch fast upon the shaft and having teeth, to engage the teeth, $b^5$, upon the gear; substantially as described.

4. In a seeding-machine the combination with the main casing, a hopper and suitable feed-wheels, mounted upon a suitable shaft, of a second shaft, E, a worm-gear, $j$, fast upon said second shaft, worm-wheels, K', engaging the feed-wheels and meshing with the worm-gear, $j$, and suitable means for rotating said second-named shaft; substantially as described.

5. In a seeding-machine, an oscillating seed-chamber for receiving the seed having an outlet through which the seed may escape, a pocketed feed-wheel journaled in said chambers and a distributing-fan for receiving the seed and throwing it away therefrom, the oscillation of the chamber being adapted to alter the position of the outlet with respect to the fan; substantially as described.

6. In a seeding-machine, a casing, a plate, F, forming the bottom of a hopper and capable of suitable oscillating motion, a distributing-fan beneath said plate for scattering the seed, said plate being formed with hollow brackets, $f, f'$, open at the top and bottom, and the feed-wheels, F', journaled in said brackets and formed with the circular sides, $f^5$, and wings, $f^6$; substantially as described.

7. In a seeding-machine, a casing, a plate, F, resting upon said casing and capable of suitable oscillating motion, said plate being formed with depending seed-chambers having outlets, $f^7$, opening out upon a suitable distributing-fan near its center, and pocketed feed-wheels in said chambers for discharging the seed therefrom, said plate being adapted to be oscillated to change the position of the outlet, $f^7$, with respect to the fan; substantially as described.

8. In a seeding-machine, a distributing-fan, a shaft, E, carrying said fan, an oscillating plate, F, formed with seed-chambers opening out upon the fan, feed-wheels journaled therein and having the gears, $k'$, and a worm, $j$, upon the shaft, E, in mesh with said gears, the plate, F, being pivoted upon the shaft, E, and adapted to be oscillated thereon to change the position of the outlets in the seed-chambers with respect to the fan; substantially as described.

9. In a seeding-machine, the combination with a hopper of two independent seed-chambers, each communicating with the main hopper and each having a separate discharge-opening, an independent valve for each seed-chamber adapted to limit the flow of seed into the same, or entirely shut off the flow, a dial, pointers upon the valves and set-screws adapted to secure either of them at any position desired whereby each may be operated independently of the other; substantially as described.

10. In a seeding-machine, a plate, F, formed with the dependent hollow brackets, $f'$, the feed-wheels, F', formed with the circular sides, $f^5$, and wings, $f^6$, and the caps, $f^2$, formed with the outlet-openings, $f^7$, secured to the brackets and adapted to serve as casings around the lower half of the feed-wheel; substantially as described.

11. In a seeding-machine, a shaft, E, a worm-gear upon said shaft, a worm-wheel in mesh with said worm-gear, a feed-wheel engaging said worm-wheel and a suitable seed-chamber inclosing said feed-wheel and provided with inlet and outlet openings; substantially as described.

12. In a seeding-machine a main driving-shaft, a gear-wheel having a sleeve encircling said shaft, but loose with respect to the latter, a clutch mechanism for locking said shaft to the gear-wheel, said clutch mechanism being fast upon the shaft and moving the same with it when itself is moved; substantially as described.

13. In a seeding-machine, a casing, D, formed with the ledge, $d'$, having an annular opening therein, a plate, F, resting upon said ledge and formed with depending seed-chambers extending through said opening, a shaft, E, journaled in said casing and carrying a suitable distributing-fan near one end, and a worm-gear, $j$, near its upper end, feed-wheels in said chambers having gears, $k'$, in mesh with said worm-gear, and suitable gearing between the shaft, E, and the wheel of a wagon, the plate, F, being pivoted upon the shaft E, whereby it may be oscillated thereon to change the position of the seed-chambers with respect to the distributing-fan without throwing the feed-wheels out of gear with the shaft, E; substantially as described.

14. In a seeding-machine a main driving-shaft, B, a sprocket-wheel rigidly mounted upon the outer end of said shaft, suitable gearing for its rotation, a beveled gear-wheel, B', having a sleeve, $b^3$, loosely mounted upon the opposite end of said shaft, and a bracket, $b^2$, said sleeve being journaled in the bracket and the gear-wheel adapted to drive the mechanism of the machine; substantially as described.

15. In a seeding-machine a main driving-shaft, a sprocket-wheel, $b$, rigidly mounted thereon and adapted to be geared to a wheel of a wagon, a beveled gear-wheel, B', loosely mounted upon the shaft, a distributing-fan, J, a pinion, $j'$, meshing with the beveled gear, B', and connected with the fan and a clutch adjacent to the rear face of the gear-wheel, B', said gear being formed with a sleeve encircling the shaft and journaled in a suitable bracket; substantially as described.

In witness whereof I have hereunto set my hand, at Joliet, Will county, and State of Illinois, this 12th day of March, A. D. 1897.

IRVING D. STEVENS.

Witnesses:
CHARLES S. SEAVER,
Mrs. E. E. PIERCE.